United States Patent
Hino et al.

(10) Patent No.: US 7,864,460 B2
(45) Date of Patent: Jan. 4, 2011

(54) LENS BARREL

(75) Inventors: Masayuki Hino, Osaka (JP); Taisei Funaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/675,228

(22) PCT Filed: Aug. 7, 2008

(86) PCT No.: PCT/JP2008/002156

§ 371 (c)(1),
(2), (4) Date: Feb. 25, 2010

(87) PCT Pub. No.: WO2009/028140

PCT Pub. Date: Mar. 5, 2009

(65) Prior Publication Data

US 2010/0214678 A1   Aug. 26, 2010

(30) Foreign Application Priority Data

Aug. 30, 2007   (JP)   ............................. 2007-223409

(51) Int. Cl.
*G02B 7/02* (2006.01)
*G02B 15/14* (2006.01)
(52) U.S. Cl. .................. 359/823; 359/811; 359/704
(58) Field of Classification Search ......... 359/694–701, 359/811–824
See application file for complete search history.

(56) References Cited

U.S. PATENT DOCUMENTS 6,324,023 B1    11/2001   Nagaoka et al.

| | | | |
|---|---|---|---|
| 7,362,522 B2 | 4/2008 | Ohsato | |
| 7,489,455 B2 * | 2/2009 | Kato | 359/811 |
| 7,551,369 B2 * | 6/2009 | Tomita et al. | 359/704 |
| 7,595,945 B2 * | 9/2009 | Nagae | 359/823 |
| 7,605,991 B2 * | 10/2009 | Chiang | 359/811 |
| 2006/0262431 A1 | 11/2006 | Ohsato | |
| 2009/0128931 A1 | 5/2009 | Matsumoto | |

FOREIGN PATENT DOCUMENTS

| | | |
|---|---|---|
| JP | 2000-2559 | 1/2000 |
| JP | 2004-184734 | 7/2004 |
| JP | 2006-243668 | 9/2006 |
| JP | 2006-292959 | 10/2006 |
| JP | 2006-330054 | 12/2006 |
| JP | 2007-10934 | 1/2007 |
| JP | 2007-187747 | 7/2007 |
| WO | 2006/109587 | 10/2006 |

OTHER PUBLICATIONS

International Search Report issued Oct. 14, 2008 in International (PCT) Application No. PCT/JP2008/002156.

* cited by examiner

*Primary Examiner*—Mohammed Hasan
(74) *Attorney, Agent, or Firm*—Wenderoth, Lind & Ponack, L.L.P.

(57) ABSTRACT

A lens barrel includes a barrel main body, a first lens movement frame, a magnetic scale, and a magnetic sensor. The first lens movement frame is arranged movably in the optical axis direction of the optical system with respect to the barrel main body. The magnetic scale is provided to the first lens movement frame. The magnetic sensor is arranged on the outside of the barrel main body, and detects the position of the first lens movement frame with respect to the barrel main body by detecting the position of the magnetic scale with respect to the barrel main body.

17 Claims, 4 Drawing Sheets

LENS BARREL

CROSS-REFERENCE TO RELATED APPLICATIONS

This U.S. National stage application claims priority under 35 U.S.C. §119(a) to Japanese Patent Application No. 2007-223409, filed in Japan on Aug. 30, 2007, the entire contents of which are hereby incorporated herein by reference.

TECHNICAL FIELD

The technology disclosed here relates to a lens barrel that supports an optical system.

BACKGROUND ART

Television cameras, camcorders, and other such imaging devices are equipped with an optical system having a zoom function, and a lens barrel that supports this optical system. The optical system has a plurality of lens groups. The lens barrel has a barrel main body and a lens movement frame that supports the lens groups. The lens movement frame is provided movably with respect to the barrel main body. The focal distance of the optical system can be varied by moving the lens movement frame in the optical axis direction with respect to the barrel main body.

A cam barrel is used to move the lens movement frame in the optical axis direction. The cam barrel is provided rotatably with respect to the barrel main body, and has a spiral guide groove that guides the lens movement frame. The lens movement frame has a linking pin that is inserted in the guide groove. When the cam barrel is rotated and driven with respect to the barrel main body, the linking pin is guided by the guide groove, and the lens movement frame moves in the optical axis direction with respect to the barrel main body according to the shape of the guide groove.

With a lens barrel such as this, known techniques for detecting the position of the lens movement frame include those discussed in Patent Citations 1 and 2, for example.

With the lens barrel discussed in Patent Citation 1, a pattern plate is provided as a detected member to the inner peripheral wall, and a photoreflector is provided as a detecting sensor so as to be opposite the pattern plate. The pattern plate and the photoreflector are used to detect the position of the cam barrel in the rotation direction, which allows the position of the lens movement frame to be calculated with respect to the barrel main body.

The lens barrel discussed in Patent Citation 2 has a first lens movement frame, a cam barrel with a groove for guiding the first lens movement frame, and a second lens fixing frame that is fixed to the barrel main body. A comb-like member is provided as a detected member to the first lens movement frame. A photointerruptor is provided as a detecting sensor to the second lens fixing frame. The pattern plate and the photointerruptor can be used to calculate the position of the first lens movement frame with respect to the second lens fixing frame.

Patent Citation 1: Japanese Laid-Open Patent Application 2004-184734

Patent Citation 2: Japanese Laid-Open Patent Application 2006-243668

DISCLOSURE OF INVENTION

With the lens barrel discussed in Patent Citation 1, however, since a gap is formed between the guide groove of the cam barrel and the linking pin of the lens movement frame, this gap tends to cause offset in the position of the lens movement frame with respect to the cam barrel. Accordingly, even though the position of the cam barrel in the rotation direction may be detected accurately, there can be a major difference between the position of the lens movement frame calculated from this detection result and the actual position of the lens movement frame. In other words, the accuracy with which the position of the lens movement frame is detected decreases with this lens barrel.

With the lens barrel discussed in Patent Citation 2, since a photointerruptor is disposed inside the cam barrel, the electrical wiring for power supply and signal transmission ends up being complicated, and this makes assembly more difficult.

It is an object to ensure good accuracy in the detection of the position of the lens movement frame while also facilitating assembly.

A lens barrel according to a first aspect is lens barrel for supporting an optical system, comprising a barrel main body, a lens movement frame, a detected member, and a detector. The lens movement frame is arranged movably in the optical axis direction of the optical system with respect to the barrel main body. The detected member is provided to the lens movement frame. The detector is provided on the outside of the barrel main body, and is configured to detect the position of the lens movement frame with respect to the barrel main body by detecting the position of the detected member with respect to the barrel main body.

With this lens barrel, since the detected member is provided to the lens movement frame, and the detector is provided to the barrel main body, the position of the lens movement frame with respect to the barrel main body can be detected more directly by the detected member and the detector. This means that there is less decrease in detection accuracy caused by the gap formed between the members, and good accuracy can be ensured for the detection of the position of the lens movement frame.

Also, since the detector is provided on the outside of the barrel main body, it is easier to install the electrical wiring used for the detector, and assembly is facilitated.

Thus, with this lens barrel, good accuracy in the detection of the position of the lens movement frame can be ensured while also facilitating assembly.

Here, a state in which the detector is provided on the outside of the barrel main body encompasses, for example, a state in which the detector is mounted from the outside of the barrel main body, and a state in which the detector can be seen from the outside of the barrel main body. Therefore, even if the detector is disposed in a portion that is recessed inside the barrel main body, as long as the detector is mounted from the outside of the barrel main body, or the detector can be seen from the outside of the barrel main body, then these states can be included in a state in which the detector is provided on the outside of the barrel main body.

Examples of possible detectors include MR (magnetic resistance) sensors, photointerruptors, and photoreflectors. If the detector is an MR sensor, then the detected member can be a magnetic scale. If the detector is a photointerruptor or a photoreflector, then the detected member can be a comb-like member.

A lens barrel according to a second aspect is the lens barrel according to the first aspect, wherein the barrel main body has a main body member and a support member that is mounted from the outside to the main body member and supports the detector. The detector is disposed on the outside of the support member.

Here, the state in which the detector is disposed on the outside of the support member encompasses, for example, a state in which the detector is mounted from the outside of the support member, and a state in which the detector can be seen from the outside of the support member. Therefore, even if the detector is disposed in a portion that is recessed inside the support member, or if the support member is inside the main body member, as long as the detector is mounted from the outside of the barrel main body, or the detector can be seen from the outside of the barrel main body, then these states can be included in a state in which the detector is provided on the outside of the support member.

A lens barrel according to a third aspect is the lens barrel according to the second aspect, wherein at least part of the support member is disposed inside the main body member.

A lens barrel according to a fourth aspect is the lens barrel according to the third aspect, further comprising a rotary frame arranged to move the lens movement frame in the optical axis direction. The rotary frame is disposed inside the barrel main body and is provided rotatably around the optical axis with respect to the barrel main body. The detected member is disposed inside the rotary frame.

A lens barrel according to a fifth aspect is the lens barrel according to the fourth aspect, wherein the rotary frame has a hole disposed at a position corresponding to the detector. At least part of the support member is disposed inside the hole.

A lens barrel according to a sixth aspect is the lens barrel according to the fifth aspect, wherein the hole is a slot extending in the rotation direction.

A lens barrel according to a seventh aspect is the lens barrel according to any of the fourth to sixth aspects, wherein at least part of the detector is disposed inside the rotary frame.

A lens barrel according to an eighth aspect is the lens barrel according to the fifth or sixth aspect, wherein the hole is formed so that the rotary frame does not interfere with the support member when the rotary frame rotates with respect to the barrel main body.

A lens barrel according to a ninth aspect is the lens barrel according to any of the first to eighth aspects, further comprising a guide member arranged to guide the lens movement frame in the optical axis direction. The guide member is fixed to the barrel main body and extends in the optical axis direction. The lens movement frame has a guide portion guided in the optical axis direction by the guide member. The position of the detected member in the optical axis direction is substantially the same as that of the guide portion.

Here, the phrase "the position of the detected member in the optical axis direction is substantially the same as that of the guide portion" encompasses a case in which the position of the detected member in the optical axis direction is exactly the same as that of the guide portion, as well as a case in which the position of the detected member in the optical axis direction is offset from that of the guide portion to the extent that accurate position detection can still be ensured.

A lens barrel according to a tenth aspect is the lens barrel according to any of the first to ninth aspects, further comprising a position adjusting mechanism configured to adjust the position of the detector with respect to the barrel main body.

Figure 1:
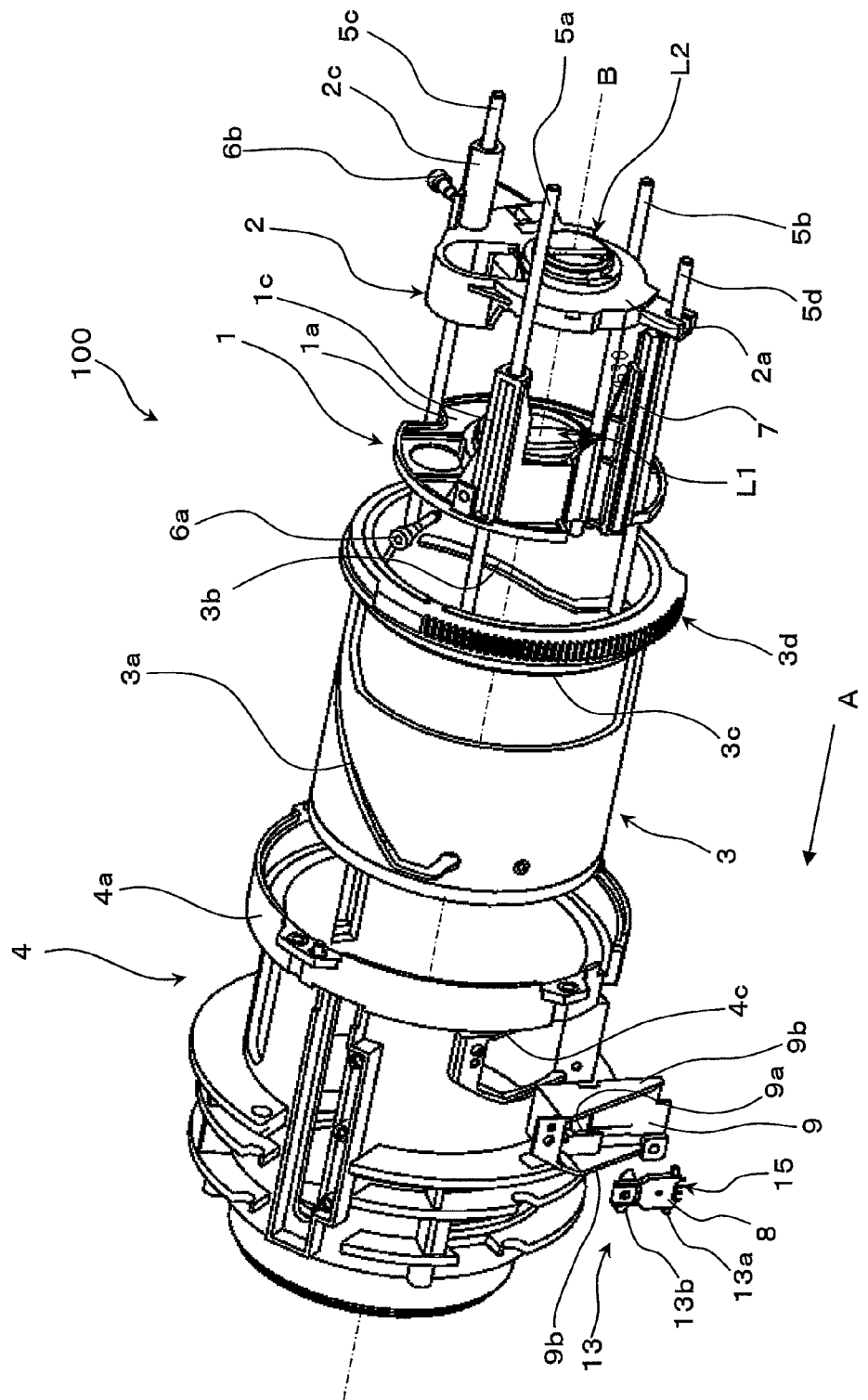
FIG. 1 is an exploded oblique view of the lens barrel according to an embodiment.

EXPLANATION OF REFERENCE 1 first lens movement frame (an example of the lens movement frame)
2 second lens movement frame
3 cam barrel (an example of the rotary frame)
4 barrel main body
4a main body member
5a, 5b, 5c, 5d guide pole (an example of the guide member)
6a, 6b linking pin
7 magnetic scale (an example of the detected member)
8 magnetic sensor (an example of the detector)
9 sensor holder (an example of the support member)
10 adjustment screw
13 position adjustment mechanism

BEST MODE FOR CARRYING OUT THE INVENTION

The embodiments will now be described through reference to the drawings.

Overall Configuration of Lens Barrel

Figure 2:
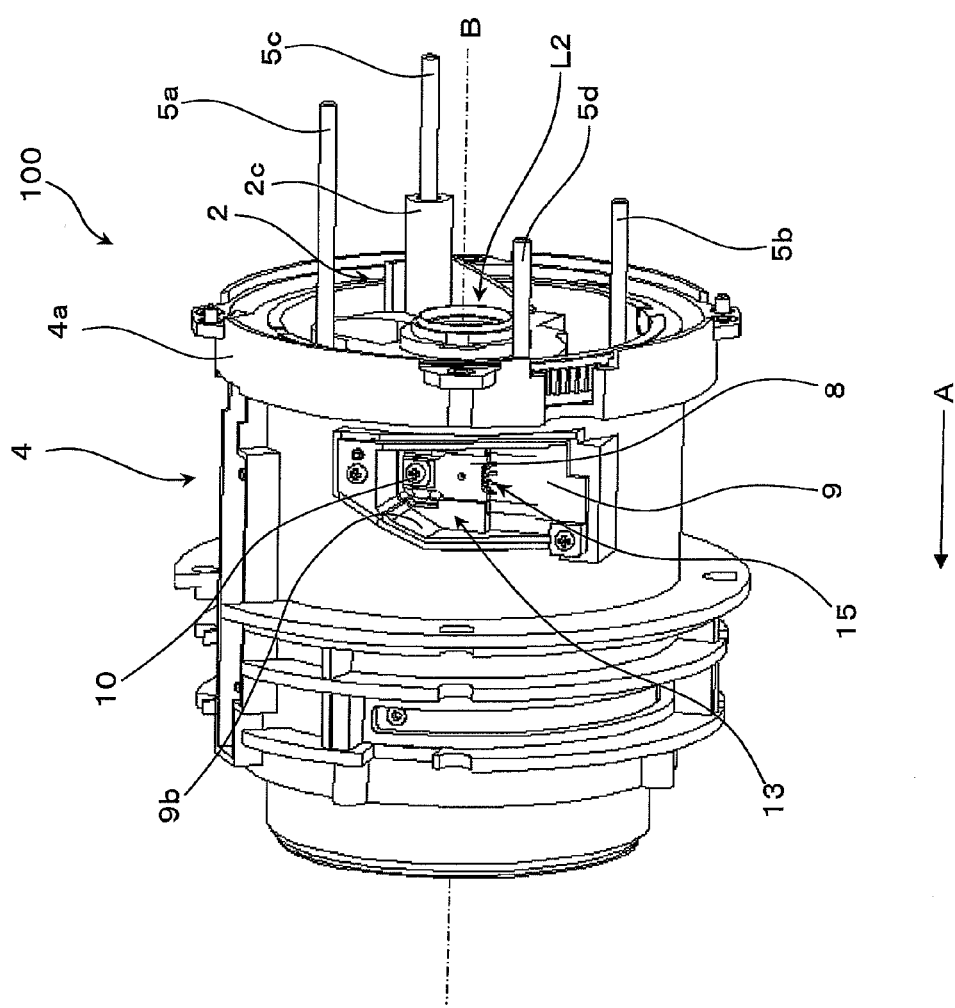
FIG. 2 is a simplified oblique view of the lens barrel according to an embodiment.
Figure 3:
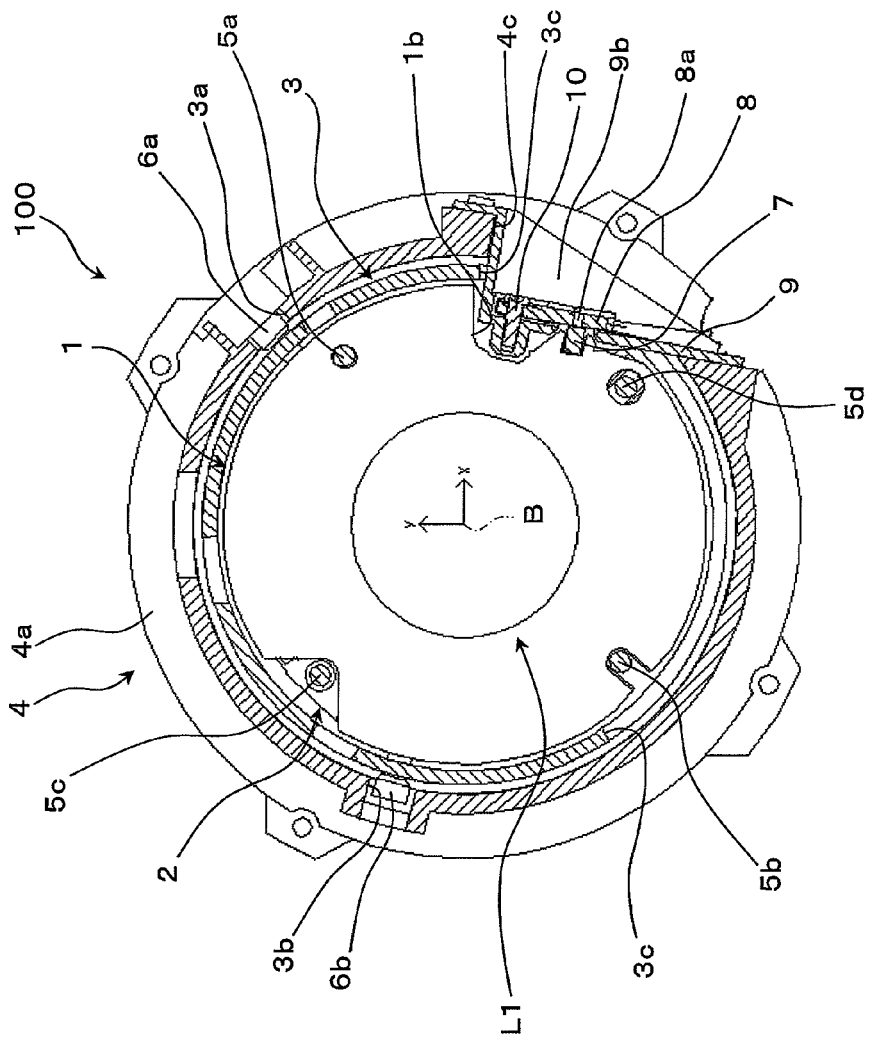
FIG. 3 is a simplified cross section of the lens barrel according to an embodiment.
Figure 4:
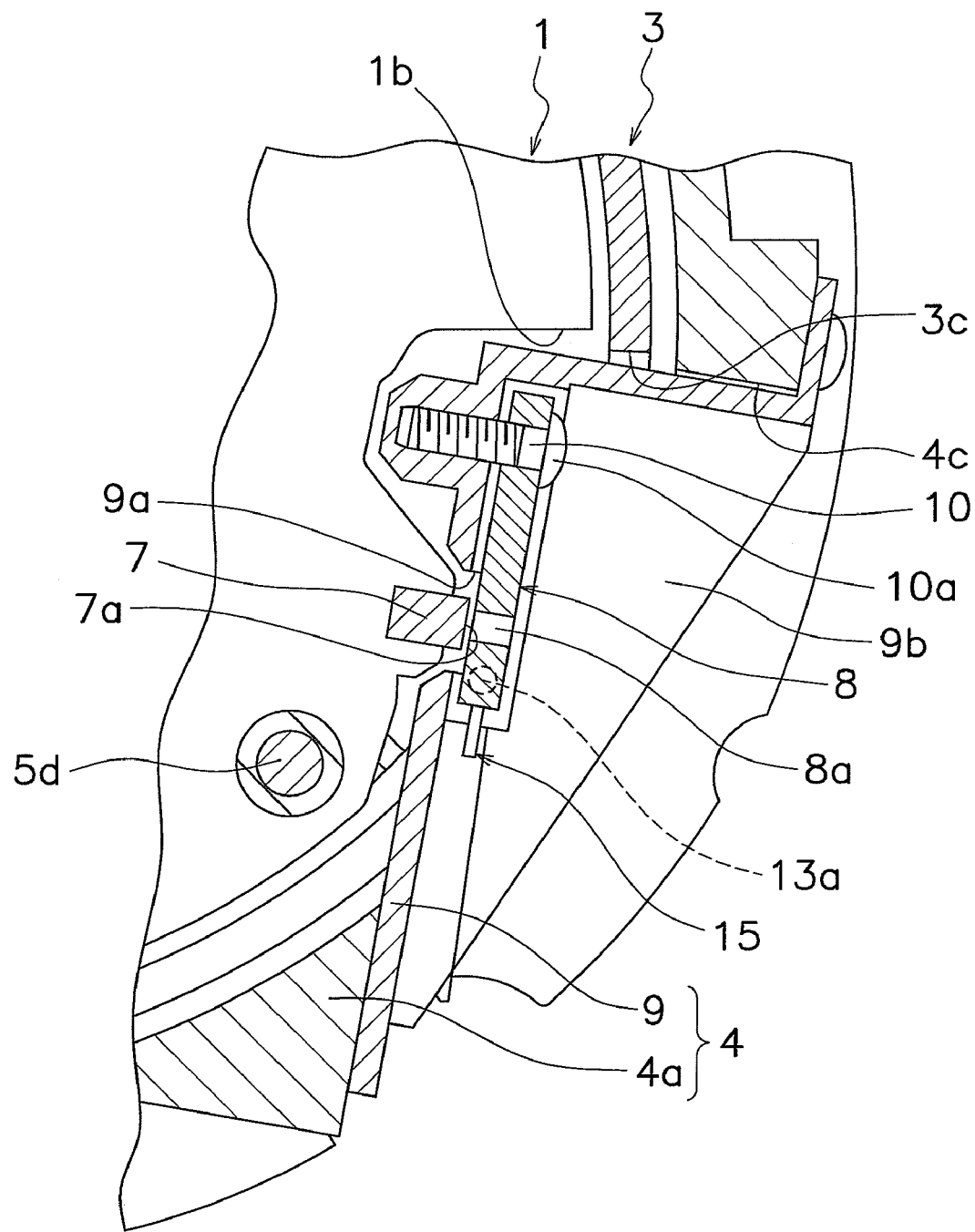
FIG. 4 is a detail enlargement of FIG. 3.

FIG. 1 is an exploded oblique view of a lens barrel 100 in an embodiment. FIG. 2 is a simplified oblique view of the lens barrel 100. The arrows A shown in FIGS. 1 and 2 indicate a direction parallel to the optical axis B. The direction parallel to the optical axis B will hereinafter be referred to as the optical axis direction. When a subject is being imaged, the direction in which the arrow A faces is the subject side. Hereinafter the subject side in the optical axis direction will be referred to as the front, and the opposite side from the subject in the optical axis direction will be the rear. FIG. 3 is a simplified cross section of the lens barrel 100. FIG. 4 is a detail enlargement of FIG. 3.

As shown in FIGS. 1 to 3, the lens barrel 100 comprises a barrel main body 4, a cam barrel 3 (an example of the rotary frame), a first lens movement frame 1, a second lens movement frame 2, and four guide poles 5a to 5d (an example of the guide member).

The barrel main body 4 houses other members on its inside, and supports the cam barrel 3 rotatably around the optical axis B. More specifically, the barrel main body 4 has a main body member 4a and a sensor holder 9 (an example of the support member) mounted to the main body member 4a.

The main body member 4a has an opening 4c into which the sensor holder 9 is fitted. The guide poles 5a to 5d, which are disposed parallel to the optical axis direction, are fixed to the main body member 4a. A first end of each of the guide poles 5a to 5d (the end on the front side in the optical axis direction) is fixed to the main body member 4a, and a second end of each of the guide poles 5a to 5d (the end on the rear side in the optical axis direction) is fixed to a barrel flange (not shown).

The sensor holder 9 is a member for supporting a magnetic sensor 8 (discussed below), and is mounted from the outside to the main body member 4a in a state of being fitted into the opening 4c. The sensor holder 9 will be discussed in detail below.

The cam barrel 3 is a member for guiding the first lens movement frame 1 and the second lens movement frame 2 in the optical axis direction, and is supported rotatably over a range of approximately 90° (which is its effective rotation angle) by the barrel main body 4. In this embodiment, the cam barrel 3 does not move in the optical axis direction with respect to the barrel main body 4. The cam barrel 3 has a gear portion 3*d*, a first cam groove 3*a*, a second cam groove 3*b*, and a slot 3*c* that extends in the rotation direction (an example of the hole).

The gear portion 3*d* meshes with the gear (not shown) of a drive motor, and the drive force of the drive motor (not shown) is transmitted through the gear portion 3*d* to the cam barrel 3. The first cam groove 3*a* is a groove for guiding the first lens movement frame 1. The second cam groove 3*b* is a groove for guiding the second lens movement frame 2.

The slot 3*c* is an opening provided in order to dispose the magnetic sensor 8 (discussed below) near a magnetic scale 7 (discussed below), and is disposed at a position corresponding to the magnetic sensor 8. The width of the slot 3*c* in the optical axis direction is slightly larger than the width of the sensor holder 9 in the optical axis direction. The dimensions of the slot 3*c* in the rotation direction are set so that the sensor holder 9 will not interfere with the cam barrel 3 when the cam barrel 3 rotates within a range of 90° (the effective rotation range).

The first lens movement frame 1 is a frame for supporting a first variator lens group L1 as a zoom lens, and is provided movably in the optical axis direction with respect to the barrel main body 4. More specifically, the first lens movement frame 1 is supported movably in the optical axis direction by the guide poles 5*a* and 5*b*. The first lens movement frame 1 has a first main body frame 1*a*, a first guide portion 1*c* that extends in the optical axis direction from the first main body frame 1*a*, and a first linking pin 6*a* that is fixed to the first main body frame 1*a*. The guide pole 5*a* passes through the first guide portion 1*c* in the optical axis direction. The first linking pin 6*a* is disposed on the periphery of the first guide portion 1*c*, and is inserted into the first cam groove 3*a* of the cam barrel 3. A cut-out 1*b* is formed in the first main body frame 1*a* to prevent interference with the sensor holder 9 (FIG. 4).

The second lens movement frame 2 is a frame for supporting a second variator lens group L2 as a zoom lens, and is provided movably in the optical axis direction with respect to the barrel main body 4. More specifically, the second lens movement frame 2 is supported movably in the optical axis direction by the guide poles 5*c* and 5*d*. The second lens movement frame 2 has a second main body frame 2*a*, a second guide portion 2*c* that extends in the optical axis direction from the second main body frame 2*a*, and a second linking pin 6*b* that is fixed to the second main body frame 2*a*. The second linking pin 6*b* is disposed on the periphery of the second guide portion 2*c*, and is inserted into the second cam groove 3*b*.

Detailed Configuration of the Lens Barrel

To detect the position of the first lens movement frame 1 in the optical axis direction with respect to the barrel main body 4, this lens barrel 100 further comprises the magnetic scale 7 (an example of the detected member), the magnetic sensor 8 (an example of the detector), a position adjustment mechanism 13, and a linear position sensor (not shown).

The magnetic scale 7 is a slender member that extends in the optical axis direction, and is bonded and fixed to the first lens movement frame 1. The magnetic scale 7 moves in the optical axis direction through the inside of the cam barrel 3, integrally with the first lens movement frame 1. S and N poles are alternately magnetized at a pitch of approximately 0.2 mm on a magnetization face 7*a* (FIG. 4) of the magnetic scale 7 that is opposite the magnetic sensor 8.

The magnetic sensor 8 is an MR (magnetic resistance) sensor for detecting the relative position of the magnetic scale 7 with respect to the barrel main body 4, and has a detecting element 8*a* and a terminal 15 connected to electrical wiring (not shown). The magnetic sensor 8 is disposed on the outside of the barrel main body 4 so that the magnetic sensor 8 can be mounted from the outside of the barrel main body 4. More precisely, the magnetic sensor 8 is mounted to the sensor holder 9 of the barrel main body 4, and is disposed on the outside of the sensor holder 9.

As shown in FIGS. 3 and 4, the sensor holder 9 has a recessed shape, and goes into the inside of the main body member 4*a* through the opening 4*c*. The magnetic sensor 8 is disposed in the recessed portion of the sensor holder 9. The sensor holder 9 is disposed in the slot 3*c* (discussed below) of the cam barrel 3 so that the sensor holder 9 does not interfere with the cam barrel 3, and part of the sensor holder 9 goes through the slot 3*c* and into the cam barrel 3. Therefore, as shown in FIGS. 3 and 4, when viewed in the optical axis direction, the magnetic sensor 8 mounted to the sensor holder 9 is disposed inside the cam barrel 3. Consequently, the magnetic sensor 8 can be disposed closer to the magnetic scale 7, which is disposed inside the cam barrel 3.

An opening 9*a* is formed in the sensor holder 9 in order to move the magnetic sensor 8 (discussed below) even closer to the magnetic scale 7. As shown in FIGS. 1 and 4, when the sensor holder 9 is viewed in the optical axis direction, a side wall 9*b* of the sensor holder 9 is in a state of being cut out by the opening 9*a*. As shown in FIG. 4, since the magnetic scale 7 goes into this opening 9*a*, the magnetic scale 7 can move in the optical axis direction close to the magnetic sensor 8.

The position adjustment mechanism 13 is a mechanism for supporting the magnetic sensor 8 so that its position can be adjusted with respect to the barrel main body 4, and has a pair of pins 13*a*, a pair of leaf springs 13*b*, and an adjusting screw 10. The pins 13*a* protrude in the optical axis direction from the magnetic sensor 8, and are inserted into holes (not shown) in the sensor holder 9. The pins 13*a* make it possible for the magnetic sensor 8 to rotate with respect to the sensor holder 9. The leaf springs 13*b* are provided to the end of the magnetic sensor 8 on the opposite side from the pins 13*a*, and protrude in the optical axis direction from the magnetic sensor 8. The adjusting screw 10 is a member for adjusting the position of the magnetic sensor 8 with respect to the barrel main body 4, and passes through a hole provided at the end of the magnetic sensor 8 on the leaf springs 13*b* side. The adjusting screw 10 meshes with the sensor holder 9.

The rotation of the magnetic sensor 8 with respect to the sensor holder 9 around the pins 13*a* is limited by the leaf springs 13*b* and the adjusting screw 10. More specifically, when the adjusting screw 10 is tightened, the leaf springs 13*b* bend between the magnetic sensor 8 and the sensor holder 9. In a state in which the leaf springs 13*b* are bent, the magnetic sensor 8 is pressed against the head 10*a* of the adjusting screw 10 by the elastic force of the leaf springs 13*b*, so orientation of the magnetic sensor 8 with respect to the 4 is stabilized. Also, the adjusting screw 10 can be loosened or tightened to adjust the position of the magnetic sensor 8 with respect to the sensor holder 9 (that is, the position of the magnetic sensor 8 with respect to the magnetic scale 7).

The linear position sensor (not shown) is a sensor for detecting the absolute position of the first lens movement frame 1 with respect to the barrel main body 4, and has a slider (not shown) that moves in the optical axis direction integrally with the first lens movement frame 1. The linear position sensor can detect the absolute position of the first lens movement frame 1 in the optical axis direction with respect to the barrel main body 4.

The magnetic sensor 8 outputs an electrical signal according to the magnetic field generated from the magnetic scale 7. When the position of the magnetic scale 7 changes with respect to the magnetic sensor 8, the magnetic field around the magnetic sensor 8 changes, and an electrical signal in the form of a sine wave is outputted according to this change in the magnetic field. The position of the first lens movement frame 1 with respect to the barrel main body 4 can be found very accurately on the basis of this electrical signal. In particular, the linear position sensor can detect the rough position of the first lens movement frame 1 with respect to the barrel main body 4 when the power is switched on. That is, the linear position sensor and the magnetic sensor 8 can be used to find the position of the first lens movement frame 1 both accurately and efficiently.

To keep the detection accuracy of the magnetic sensor 8 at a high level, the distance between the magnetic scale 7 and the magnetic sensor 8 must be kept at about 0.1 mm, for example. To achieve this configuration, as shown in FIGS. 3 and 4, part of the sensor holder 9 goes through the slot 3c and into the cam barrel 3. As a result, the magnetic sensor 8 mounted to the sensor holder 9 is disposed in the interior of the cam barrel 3. Furthermore, since the opening 9a is formed in the sensor holder 9, and the magnetic scale 7 goes into this opening 9a, the magnetic scale 7 can move in the optical axis direction near the magnetic sensor 8. Consequently, the magnetic sensor 8 can be disposed near the magnetic scale 7 in a state in which the magnetic sensor 8 is exposed on the outside of the sensor holder 9 and the barrel main body 4.

To achieve good dimensional accuracy between the magnetic sensor 8 and the magnetic scale 7 within the movable range of the first lens movement frame 1, the magnetic scale 7 is fixed to the first lens movement frame 1 so as to be parallel to the optical axis direction. In addition, after assembly the adjusting screw 10 is turned and the position of the magnetic sensor 8 is adjusted so that the distance between the magnetic sensor 8 and the magnetic scale 7 is approximately 0.1 mm. As a result, when the magnetic scale 7 moves integrally with the first lens movement frame 1, the magnetic sensor 8 can maintain its state of being opposite and close to the magnetization face 7a of the magnetic scale 7.

Features of Lens Barrel

The features of the lens barrel 100 described above are compiled below.

(1)

With this lens barrel 100, since the magnetic scale 7 is provided to the first lens movement frame 1, and the magnetic sensor 8 is provided to the barrel main body 4, the position of the first lens movement frame 1 with respect to the barrel main body 4 can be directly detected by the magnetic scale 7 and the magnetic sensor 8. Consequently, the gap formed between the members will cause less of a decrease in the accuracy with which the position of the first lens movement frame 1 is detected, and accuracy in the detection of the position of the first lens movement frame 1 can therefore be ensured.

Also, since the magnetic sensor 8 is provided on the outside of the barrel main body 4, it is easier to install electrical wiring for the magnetic sensor 8, and this facilitates assembly. For example, since the terminal 15 of the magnetic sensor 8 is exposed on the outside, it is easy to connect the terminal 15 to electrical wiring.

Thus, with the lens barrel 100, accurate detection of the position of the first lens movement frame 1 can be ensured while facilitating assembly.

Here, a state in which the magnetic sensor 8 is provided on the outside of the barrel main body 4 encompasses, for example, a state in which the magnetic sensor 8 is mounted from the outside of the barrel main body 4, and a state in which the magnetic sensor 8 can be seen from the outside of the barrel main body 4. Therefore, as shown in FIGS. 1 to 4, even if the magnetic sensor 8 is disposed in a portion that is recessed inside the barrel main body 4 (more precisely, the recessed portion of the sensor holder 9), as long as the magnetic sensor 8 is mounted from the outside of the barrel main body 4, or the magnetic sensor 8 can be seen from the outside of the barrel main body 4, then these states can be included in a state in which the magnetic sensor 8 is provided on the outside of the barrel main body 4.

(2)

With this lens barrel 100, the barrel main body 4 has the main body member 4a and the sensor holder 9 mounted to the main body member 4a from the outside. Since the magnetic sensor 8 is disposed on the outside of the sensor holder 9, the magnetic sensor 8 can be attached to the sensor holder 9 from the outside after the sensor holder 9 has been attached to the main body member 4a, for example. Also, the sensor holder 9 and the magnetic sensor 8 can be integrally attached to the main body member 4a from the outside after the magnetic sensor 8 has been attached to the sensor holder 9. In other words, with this lens barrel 100 there is greater latitude during assembly.

Here, a state in which the magnetic sensor 8 is provided on the outside of the sensor holder 9 encompasses, for example, a state in which the magnetic sensor 8 is mounted from the outside of the sensor holder 9, and a state in which the magnetic sensor 8 can be seen from the outside of the sensor holder 9. Therefore, as shown in FIGS. 1 to 4, even if the magnetic sensor 8 is disposed in a portion of the sensor holder 9 that is recessed, or if the sensor holder 9 goes into the main body member 4a, as long as the magnetic sensor 8 is mounted from the outside of the barrel main body 4, or the magnetic sensor 8 can be seen from the outside of the barrel main body 4, then these states can be included in a state in which the magnetic sensor 8 is provided on the outside of the sensor holder 9.

(3)

With this lens barrel 100, since part of the sensor holder 9 is disposed inside the main body member 4a, the sensor holder 9 can be disposed near the magnetic scale 7. As a result, the magnetic sensor 8 attached to the sensor holder 9 can be disposed near the magnetic scale 7, and this makes it easier to ensure accurate detection of the position of the first lens movement frame 1.

(4)

With this lens barrel 100, since part of the sensor holder 9 is disposed in the slot 3c, it is easier to disposed the magnetic sensor 8 near the magnetic scale 7, and it is easier to ensure accurate detection of the position of the first lens movement frame 1.

(5)

With this lens barrel 100, since the magnetic sensor 8 is disposed inside the cam barrel 3, it is easy to disposed the magnetic sensor 8 near the magnetic scale 7 even though the magnetic scale 7 is disposed inside the of the cam barrel 3.

(6)

With this lens barrel 100, since the slot 3c is formed so that the cam barrel 3 will not interfere with the sensor holder 9 when the cam barrel 3 is rotated with respect to the barrel main body 4, disposing part of the sensor holder 9 in the slot 3c will not affect the rotation of the cam barrel 3.

(7)

With this lens barrel 100, since the position of the magnetic scale 7 in the optical axis direction is substantially the same as that of the guide portion 1c, even if the first lens movement frame 1 is inclined with respect to the guide pole 5a because of the gap formed between the guide pole 5a and the guide portion 1c, inclination of the magnetic scale 7 with respect to the magnetic sensor 8 can be suppressed. Consequently, the gap formed between the members will decrease the accuracy of position detection with the magnetic sensor 8 less than when the position of the magnetic scale 7 in the optical axis direction is greatly offset from that of the guide portion 1c.

Here, the phrase "the position of the magnetic scale 7 in the optical axis direction is substantially the same as that of the guide portion 1c" encompasses a case in which the position of the magnetic scale 7 in the optical axis direction is exactly the same as that of the guide portion 1c, as well as a case in which the position of the magnetic scale 7 in the optical axis direction is offset from that of the guide portion 1c to the extent that accurate position detection can still be ensured.

(8)

With this lens barrel 100, since the position of the magnetic sensor 8 with respect to the barrel main body 4 can be adjusted by the position adjustment mechanism 13, the position of the magnetic sensor 8 can be fine-tuned with respect to the magnetic scale 7, and an accurate distance between the magnetic scale 7 and the magnetic sensor 8 can be ensured.

In particular, since the magnetic sensor 8 is disposed on the outside of the barrel main body 4, position adjustment with the position adjustment mechanism 13 can be performed after the assembly of the lens barrel 100 has been completed.

(9)

One conceivable example of the disposition of the magnetic sensor is a case in which the magnetic sensor is disposed to the rear of the barrel main body and the cam barrel (on the right side in FIG. 1). In this case, the magnetic scale is disposed so as to protrude to the rear in the optical axis direction from the barrel main body and the cam barrel. The magnetic sensor detects the position of the magnetic scale protruding to the rear.

With this constitution, since the position of the magnetic scale is farther away from the first lens movement frame, it is more difficult to maintain accurate parallelism between the magnetic scale and the optical axis, and there is the risk that position detection accuracy will decrease. Furthermore, when the first lens movement frame moves to the rear in the optical axis direction, the magnetic scale protrudes, and this is contrary to the goal of making the lens barrel more compact.

With the above-mentioned lens barrel 100, however, since the magnetic sensor 8 is disposed on the outside of the barrel main body 4 in the radial direction, the magnetic scale 7 can be disposed closer to the first lens movement frame 1 than when the magnetic sensor 8 is disposed to the rear of the barrel main body 4. Accordingly, accurate position detection can be ensured. Furthermore, since the magnetic scale 7 does not stick out to the rear, the lens barrel 100 can be made more compact in the optical axis direction than when the magnetic sensor 8 is disposed to the rear of the barrel main body 4.

Other Embodiments

The specific constitution of the present invention is not limited to the embodiment given above, and various changes and modifications are possible without departing from the scope of the invention.

(A)

In the above embodiment, an example was described in which the magnetic scale 7 was used as the detected member and the magnetic sensor 8 (MR sensor) was used as the detector for detecting the position of the detected member, but the detector and detected member are not limited to these. For instance, the detector may be a photointerruptor or a photoreflector. If the detector is a photointerruptor or a photoreflector, then the detected member can be a comb-like member.

(B)

In the above embodiment, the magnetic sensor 8 was disposed inside the cam barrel 3, but at least part of the magnetic sensor 8 (more precisely, the detecting element 8a) may be disposed inside of the cam barrel 3.

Also, part of the sensor holder 9 was disposed inside the cam barrel 3, but all of the sensor holder 9 may instead be disposed inside the cam barrel 3.

(C)

In the above embodiment, the slot 3c was formed in the cam barrel 3 in order to disposed the magnetic scale 7 near the magnetic sensor 8, but the slot 3c need not extend in the rotation direction, and may be formed as a hole instead.

Also, if the portion of the cam barrel 3 located between the magnetic scale 7 and the magnetic sensor 8 is made of a magnetically permeable material, a hole need not be formed in the cam barrel 3, and the position of the magnetic scale 7 can still be detected by the magnetic sensor 8. For example, if the portion of the cam barrel 3 located between the magnetic scale 7 and the magnetic sensor 8 is thin, then the accuracy of position detection by the magnetic sensor 8 can be easily ensured at an intended level.

The magnetic scale 7 and the magnetic sensor 8 can also be disposed away from each other by increasing the magnetization pitch of the magnetic scale 7 (the distance between the S and N poles). Therefore, it is possible to detect the position of the first lens movement frame 1 even when the portion of the cam barrel 3 located between the magnetic scale 7 and the magnetic sensor 8 is thick.

INDUSTRIAL APPLICABILITY

With the lens barrel disclosed above, accurate detection of the position of the lens movement frame can be ensured while also facilitating assembly, so the technology disclosed above is useful in the field of lens barrels for supporting an optical system.

The invention claimed is:

1. A lens barrel for supporting an optical system, comprising:
    a barrel main body;
    a lens movement frame arranged movably in the optical axis direction of the optical system with respect to the barrel main body;
    a detected member provided to the lens movement frame;
    a detector arranged on the outside of the barrel main body, and configured to detect the position of the lens movement frame with respect to the barrel main body by detecting the position of the detected member with respect to the barrel main body; and
    a rotary frame arranged to move the lens movement frame in the optical axis direction, the rotary frame disposed inside the barrel main body and arranged rotatable around the optical axis with respect to the barrel main body, wherein
    the detected member is disposed inside the rotary frame.

2. The lens barrel according to claim 1, wherein
    the barrel main body has a main body member and a support member mounted from the outside to the main body member and supporting the detector, and
    the detector is disposed on the outside of the support member.

3. The lens barrel according to claim 2, wherein at least part of the support member is disposed inside the main body member.

4. The lens barrel according to claim 3, wherein
    at least part of the detector is disposed inside the rotary frame.

5. The lens barrel according to claim 3, further comprising
a guide member arranged to guide the lens movement frame in the optical axis direction, the guide member fixed to the barrel main body and extending in the optical axis direction, wherein
the lens movement frame has a guide portion guided in the optical axis direction by the guide member, and
the position of the detected member in the optical axis direction is substantially the same as that of the guide portion.

6. The lens barrel according to claim 2, wherein
the rotary frame has a hole disposed at a position corresponding to the detector, and
at least part of the support member is disposed inside the hole.

7. The lens barrel according to claim 6, wherein
the hole is a slot extending in the rotation direction.

8. The lens barrel according to claim 6, wherein
the hole is formed so that the rotary frame does not interfere with the support member when the rotary frame rotates with respect to the barrel main body.

9. The lens barrel according to claim 2, further comprising
a guide member arranged to guide the lens movement frame in the optical axis direction, the guide member fixed to the barrel main body and extending in the optical axis direction, wherein
the lens movement frame has a guide portion guided in the optical axis direction by the guide member, and
the position of the detected member in the optical axis direction is substantially the same as that of the guide portion.

10. The lens barrel according to claim 2, further comprising
a position adjusting mechanism configured to adjust the position of the detector with respect to the barrel main body.

11. The lens barrel according to claim 10, wherein
at least part of the detector is disposed inside the rotary frame.

12. The lens barrel according to claim 1, wherein
the rotary frame has a hole disposed at a position corresponding to the detector, and
at least part of the support member is disposed inside the hole.

13. The lens barrel according to claim 12, wherein
the hole is a slot extending in the rotation direction.

14. The lens barrel according to claim 12, wherein
the hole is formed so that the rotary frame does not interfere with the support member when the rotary frame rotates with respect to the barrel main body.

15. The lens barrel according to claim 1, wherein
at least part of the detector is disposed inside the rotary frame.

16. The lens barrel according to claim 1, further comprising
a guide member arranged to guide the lens movement frame in the optical axis direction, the guide member fixed to the barrel main body and extending in the optical axis direction, wherein
the lens movement frame has a guide portion guided in the optical axis direction by the guide member, and
the position of the detected member in the optical axis direction is substantially the same as that of the guide portion.

17. The lens barrel according to claim 1, further comprising
a position adjusting mechanism configured to adjust the position of the detector with respect to the barrel main body.

* * * * *